US006904417B2

(12) United States Patent
Clayton et al.

(10) Patent No.: US 6,904,417 B2
(45) Date of Patent: Jun. 7, 2005

(54) POLICY NOTICE METHOD AND SYSTEM

(75) Inventors: Gary E. Clayton, Dallas, TX (US); Kevin I. Robertson, Dallas, TX (US); Harry T. Carneal, Dallas, TX (US)

(73) Assignee: Jefferson Data Strategies, LLC, Washington, DC (US)

( * ) Notice: Subject to any disclaimer, the term of this patent is extended or adjusted under 35 U.S.C. 154(b) by 388 days.

(21) Appl. No.: 09/754,898

(22) Filed: Jan. 5, 2001

(65) Prior Publication Data

US 2002/0010784 A1 Jan. 24, 2002

Related U.S. Application Data

(60) Provisional application No. 60/174,662, filed on Jan. 6, 2000.

(51) Int. Cl.[7] .............................................. G06T 17/60
(52) U.S. Cl. ............................... 705/59; 705/1; 705/78; 709/201; 713/200
(58) Field of Search ............................ 705/1, 59, 78; 709/201; 713/200

(56) References Cited

U.S. PATENT DOCUMENTS

| 5,499,297 | A | | 3/1996 | Boebert ........................ 380/23 |
| 5,987,440 | A | | 11/1999 | O'Neil et al. .................. 705/44 |
| 6,092,197 | A | * | 7/2000 | Coueignoux ................. 713/200 |
| 6,266,775 | B1 | * | 7/2001 | Kamba ......................... 713/202 |
| 6,496,802 | B1 | * | 12/2002 | van Zoest et al. ............. 705/14 |

FOREIGN PATENT DOCUMENTS

KR         2001092805    * 10/2001    ........... H04L/12/58

OTHER PUBLICATIONS

Matthews, J, Form PCT/ISA/210 International Search Report for PCT/US01/00530 (3 pp.).

* cited by examiner

Primary Examiner—James P. Trammel
Assistant Examiner—John M Winter
(74) Attorney, Agent, or Firm—Jenkens & Gilchrist, P.C.

(57) ABSTRACT

A preferred embodiment of the present invention comprises a method and system for promoting compliance with data protection and privacy laws and regulations relating to the privacy rights of individuals. The method comprises the following steps: (1) informing an individual involved in potential disclosure of the individual's personal data to an entity that the entity has certified its compliance with approved privacy and data security practices; (2) obtaining the individual's consent to have the entity receive, or acknowledgment that the entity will receive, and use the individual's personal data in accordance with a stated policy or with relevant data protection and privacy laws and regulations covering the use of personal data in at least the individual's country of location; (3) transmitting to the entity data indicating that the individual has been informed of the entity's privacy practices and consented to the entity receiving, or acknowledgment that the entity will be receiving, and using the individual's personal data; (4) receiving from the entity data comprising personal data collected by the entity from the individual; and (5) periodically checking whether the entity has complied with the stated policy or with relevant data protection and privacy laws and regulations covering the use of personal data in at least the individual's or the entity's country of location.

36 Claims, 15 Drawing Sheets

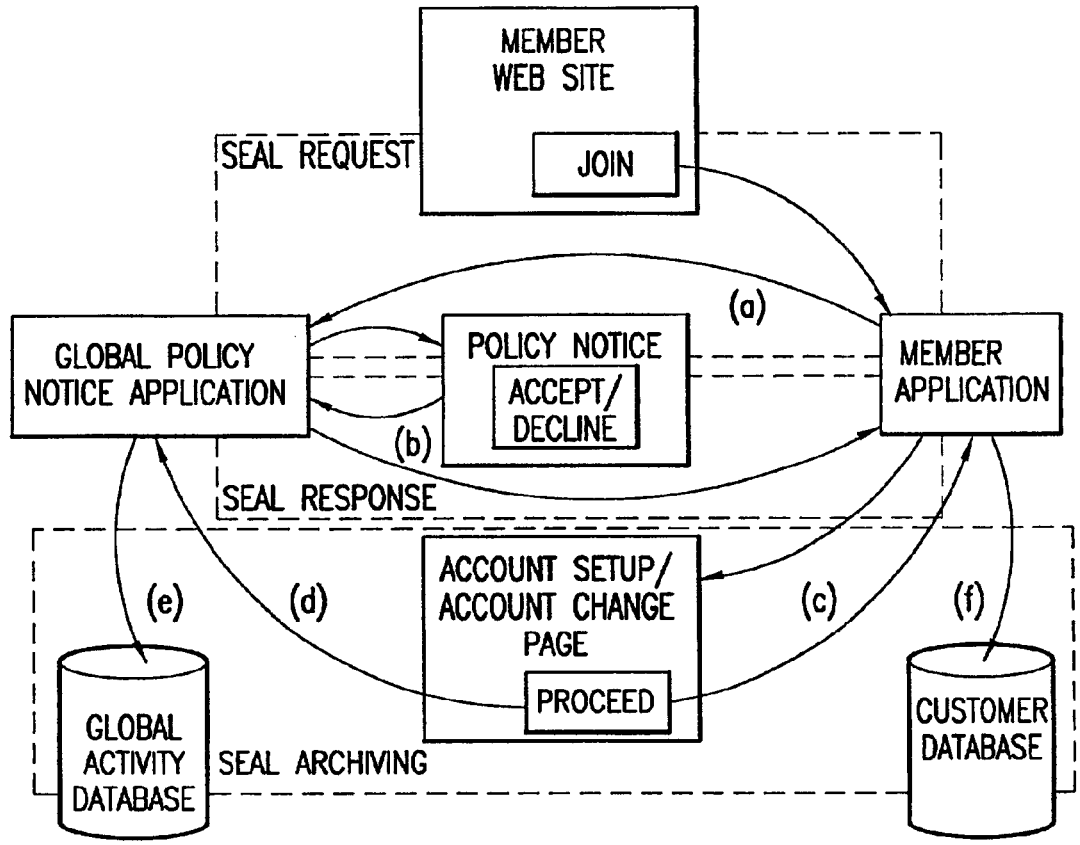

SEAL PROCESS SEQUENCE & CONTENT
  SEAL REQUEST
    (a) SEND: MEMBER ID, CUSTOMER IP
  SEAL RESPONSE
    (b) SEND ENCRYPTED: SEAL KEY & RESPONSE
  SEAL COMPLETION
    (c) SEND: SEAL KEY, CUSTOMER ACCOUNT INFORMATION
    (d) SEND ENCRYPTED: SEAL KEY, CUSTOMER FIRST NAME, SURNAME,
           ALL CUSTOMER ACCOUNT INFORMATION (AS ONE FIELD)
  SEAL ARCHIVING
    (e) RECORD INDEX - SEAL KEY
        QUERY INDEX - DATE, FIRST NAME, SURNAME, MEMBER ID
        ENFORCEMENT INDEX - EXPIRY DATE
    (f) NORMAL CUSTOMER DATA + SEAL KEY

SEAL KEY STRUCTURE
  DATE & TIME
  MEMBER ID
  CUSTOMER IP
  PRIVACY POLICY ID
  INSURANCE ID
  LANGUAGE ID
  + CHECK DIGIT

FIG.3

| Batch Sample Code at Member Site |
|---|
| auditValidSealID() |
| auditUniqueSealID() |
| auditExpiryDate() |
| auditDecryptedSample() |

| Plug-ins at Member Site |
|---|
| requestSealPage() |
| getPrivacyDetailSeal() |
| getInsuranceDetailSeal() |
| updateSealCountry() |
| updateSealViewLanguage() |
| requestSealID |
| generateCheckSum() |
| excryptSealID() |
| declineSeal() |

FIG.7C

POLICY NOTICE METHOD AND SYSTEM

This application claims the benefit of application Ser. No. 60/174,662 filed on Jan. 6, 2000.

FIELD OF THE INVENTION

The present invention is directed to network-based information exchange or data transfer, and more particularly to Internet-based information exchange or data transfer between companies and consumers located in different regions or countries.

BACKGROUND

Over the last few years, consumers, employees, the press, and government officials have all started paying closer attention to how businesses use, collect, and distribute personal information of individuals. In the United States, the Federal Trade Commission (FTC) took the lead on this around 1997 when it started holding hearings on how the "look-up industry" used personal information. These hearings focused on the major data companies in the United States (Lexis-Nexis, Trans Union, Equifax, Acxiom, and CDB Infotek) and a number of other credit bureaus and data companies. As a result of the hearings, the FTC convinced data companies that they should establish self-regulatory procedures. These major data companies formed the Individual Reference Services Group (the "IRSG"), which maintains a web site at http://www.irsg.org.

Following the efforts of the IRSG, there was the formation of the Online Privacy Alliance (hffp:// www.privacyalliance.org), Trust-e (http://www.truste.orp), Better Business Bureau Online (http://www.bbbonline.org), and other similar organizations. All of these were established by businesses as an effort to fend off new privacy legislation. All of them are, to some extent, governed by the same businesses they purport to supervise. And all of them tend to take a passive approach to privacy regulation on the Internet.

Most of these organizations charge a nominal fee for membership. Most of them have on-line questionnaires that they ask the businesses to complete. However, these organizations do not maintain arty ongoing, regular supervision of the businesses they purport to supervise. And, most importantly, they all set the minimal standards for privacy protection rather than the standards imposed by 40 of the most developed nations, including most of the members of the Organisation for Economic Co-operation and Development ("OECD") and the European Union ("EU").

The European Union is comprised of about 15 member states (there are an additional 8 nations awaiting EU membership), including those that constitute most of Western Europe. The EU currently has approximately 365 million residents. And there are about 40 nations in total that are adopting privacy laws designed to meet the EU standards. This means that there are about 1 billion citizens in nations that are adopting the privacy laws of the EU.

The EU privacy laws are based upon the Directive on Data Privacy (effective October 1998). Under the EU Directive on Data Privacy, a country that does not provide "adequate protection" to ensure the privacy of its citizens can have all data flows from the EU shut off. The United States, for example, is not considered to be providing provide adequate protection. Unless certain procedures are adopted, American companies and/or Internet companies will not be able to process any personal data on individuals who are residents of the European Union—or any of the other countries that have adopted the same sort of procedures as the EU. An Internet company in the U.S., for example, could not take personal information from a citizen of the EU in order to ship goods to that customer in the EU. An American corporation with its headquarters in the United States would not be able to send personnel information to the U.S. for making decisions on staffing, etc.

The possibility of reducing data flow between the U.S. and Europe threatens almost $1 trillion per year in information and services between the U.S. and Europe. In order to avoid such a dire result, the U.S. and the EU have negotiated a "Safe Harbor" agreement that allows U.S. companies to certify that they will comply with the EU Directive on Data Privacy—without having to first register and comply with the bureaucratic procedures established by the EU Directive.

The U.S. and the EU announced a Safe Harbor Agreement on Dec. 15, 1999. The Safe Harbor program is not a way for U.S. companies to avoid the EU Directive on Data Privacy; rather, it is simply a way for U.S. companies to avoid having to comply with the bureaucratic application process required by the Directive. In short, American companies will be able to self-certify that they will comply with the requirements of the Directive on Data Privacy. This can still be challenged at a later date, but the self-certification carries with it a presumption that the U.S. company is in compliance.

The principles of the Directive on Data Privacy comprise the requirement that personal data shall be processed fairly and lawfully. This requirement has several components. The most important component for present purposes is that an individual must have given explicit consent to the processing of the individual's personal information. "Consent" is defined as " . . . any freely given specific and informed indication of his wishes by which the data subject signifies his agreement to personal data relating to him being processed." Another important requirement is that "[p]ersonal data shall not be transferred to a country or territory outside the European Economic Area, unless that country or territory ensures an adequate level or protection for the rights and freedoms of data subjects in relation to the processing of personal data."

The Directive establishes a number of rights for individuals with respect to personal data about them held by others. Very briefly, these rights comprise: (1) right of access to data; (2) right to prevent processing likely to cause damage or distress; (3) right to prevent processing for direct marketing; (4) right to know certain information about automated decision-making; (5) right to take action for compensation for damages; and (6) right to take action to rectify, block, erase or destroy inaccurate data.

Most privacy seal programs are funded and run by the companies that are being supervised. This places in doubt the reliability and impartiality of such programs. Indeed, in two well-publicized privacy breaches by its member companies, one organization refused to intervene because of the relationships that the member companies had with the organization. Also, a recent joint project of the Office of the Information and Privacy Commissioner of Ontario and the Federal Privacy Commissioner of Australia noted numerous inadequacies of the current seal programs.

SUMMARY

A preferred embodiment of the present invention comprises a method for promoting compliance with data protection and privacy laws and regulations relating to the privacy rights of individuals. The method comprises the following steps: (1) informing an individual involved in potential disclosure of the individual's personal data to an entity that the entity has certified its compliance with approved privacy and data security practices that conform to relevant data protection and privacy laws and regulations covering the use of personal data in at least the individual's or the entity's country of location; (2) obtaining the individual's consent to have the entity receive (or acknowledgment that the entity will receive) and use the individual's personal data in accordance with a stated policy or with relevant data protection and privacy laws and regulations covering the use of personal data in at least the individual's or the entity's country of location; (3) transmitting to the entity data indicating that the individual has been informed of the entity's privacy practices and consented to the entity receiving (or acknowledged that the entity will be receiving) and using the individual's personal data in accordance with the entity's stated policy or with relevant data protection and privacy laws and regulations covering the use of personal data in at least the individual's or the entity's country of location; (4) receiving from the entity data comprising personal data collected by the entity from the individual; (5) storing said personal data received from the entity; and (6) periodically checking whether the entity has complied with the stated policy or with relevant data protection and privacy laws and regulations covering the use of personal data in at least the individual's or the entity's country of location. The method preferably also includes a step of informing the individual that the entity is covered by insurance or an equivalent risk instrument to protect against risk of loss or harm caused to the individual arising from misuse or loss of the individual's personal data by the entity.

Preferably, the data indicating that the individual has consented to have the entity receive (or acknowledged that the entity will receive) and use the individual's personal data comprises data uniquely identifying details relating to the individual's consent or acknowledgment (e.g., consumer IP address, language identification, country identification, expiration period), and is compressed using a hash function.

When the entity transmits personal data collected by the entity from the individual back to the operator of a system performing the preferred method, that transmitted data preferably includes the data transmitted to the entity by the system operator uniquely identifying details relating to the individual's consent or (acknowledgment). The preferred method can be performed with a multiplicity of entities and individuals located in a single country, or with a multiplicity of entities and individuals located in a multiplicity of countries.

The preferred embodiment of the present invention also comprises a system that includes a web application on an Internet server at a system web site that receives a redirected URL from an established member's web site and displays a Policy Notice over the Internet to a customer who has been redirected to the system web site upon accessing the member's join page. The presented Policy Notice is preferably linked to displays comprised of privacy laws and insurance policies that apply to the customer's country of residence, as well as an agreement provided by the member agreeing to protect the consumer's personal information in accordance with the privacy laws of the country of residence of the consumer. In an alternate embodiment, the agreement provided by the member agreeing to protect the consumer's personal information is in accordance with the privacy laws of the country of residence of the member.

The customer reads the agreement and agrees or disagrees to provide his personal information. Herein, "agreement" may also comprise an acknowledgment that the member will receive the customer's information. Throughout this description, the terms "agree" or "accept" should be understood to cover the case where the term "acknowledge" is more accurate. If the customer agrees, then he presses an "Agree" button (or otherwise indicates acceptance (or acknowledgment), as known in the art); if the customer disagrees, he presses a "Reject" button (or otherwise indicates a desire to reject the agreement). The results are returned from the system web site to the member's web site in the form of a hash code that preferably comprises data indicating the customer's acceptance or rejection of the agreement, as well as information such as a date/time stamp and the customer's IP address. If the customer pressed the "Agree" button, the member's web site will present a form requesting personal information. When the customer submits this completed form to the member's web site, a copy of the information is sent to the system web site and a copy is submitted to the member's database for further processing. Also the hash code is sent back to the system web site for future use in connection with audit or dispute resolution procedures.

The privacy notice is preferably based on an audit performed by independent organizations (such as PriceWaterhouseCoopers) that have been approved by an operator of a preferred system. The independent organizations certify to the system operator that approved privacy standards are being met. The organizations provide the system operator with information sufficient to determine how personal information is collected and used. However, in an alternate embodiment, the privacy notice is based solely or primarily on information provided by the member.

Preferably, a system operator provides an independent organization with a template to provide the system operator with information to be used on the privacy notices. Once the template is completed, a preferred system provides the privacy notices to individual consumers. A privacy notice is provided the first time a consumer is asked to provide personal information to a member web site (no personal information is collected at the member web site at this stage). When the consumer reaches the URL at the site that would normally collect such personal information, a preferred system provides that page to the customer, who has been re-directed to the preferred system web site. The page includes the privacy notices and information about the way the system works.

Servers used in a preferred system keep an audit trail for each company, showing what privacy notices were provided and what information was collected. A database keeps track of how long personal information will be maintained by each company. An operator of a preferred system notifies the company and the consumer when such a time period has expired, and requires the company to confirm that personal information is either deleted or treated according to the wishes of the individual consumer. The audit trail can be used in the event of a dispute between participating businesses and the consumers.

A significant differentiating feature of a preferred embodiment of the present invention over other systems is the provision of insurance. A participating consumer is preferably offered an insurance policy (e.g., $100,000) that can be used in the event of actual damages sustained by the consumer due to misuse or loss of the consumer's personal information by a participating company. The policy preferably allows the consumer to proceed locally and recover damages from a covered company regardless of the domicile of the company in question.

The insurance program is designed to ensure that a participating company will work with an insurance company to resolve disputes. If the disputes are not resolved and if claims are paid, then the company will have to reimburse the insurance company for intentional violations of privacy rights.

A preferred system comprises a component that regularly checks member companies to ensure that they are complying with their stated privacy policies. The verification is preferably supported by random inspections by auditing companies. Companies that violate their privacy policies and/or which fail to correct their deficiencies may have their Policy Notice removed. If they use the Policy Notice in violation of system rules, enforcement actions are initiated against the company. Appropriate regulatory authorities may be notified of the violations and may use the audit trail information to support any appropriate actions against the violating company. See FIG. 5.

A preferred embodiment thus provides both parties to an e-commerce transaction with monetary reasons for protecting privacy. Consumers have an independent verification that the company they are dealing with is legitimate and will use personal data appropriately. If there are violations, a consumer has recourse against an insurance policy. Member companies have consumers trust them to use information appropriately, and are able to do business within European Union and other countries.

BRIEF DESCRIPTION OF THE DRAWINGS

FIG. 3 is a process diagram for a preferred embodiment.

FIGS. 7A, 7B, and 7C comprise a design class diagram for a preferred embodiment.

DETAILED DESCRIPTION OF PREFERRED EMBODIMENTS

Figure 1A:
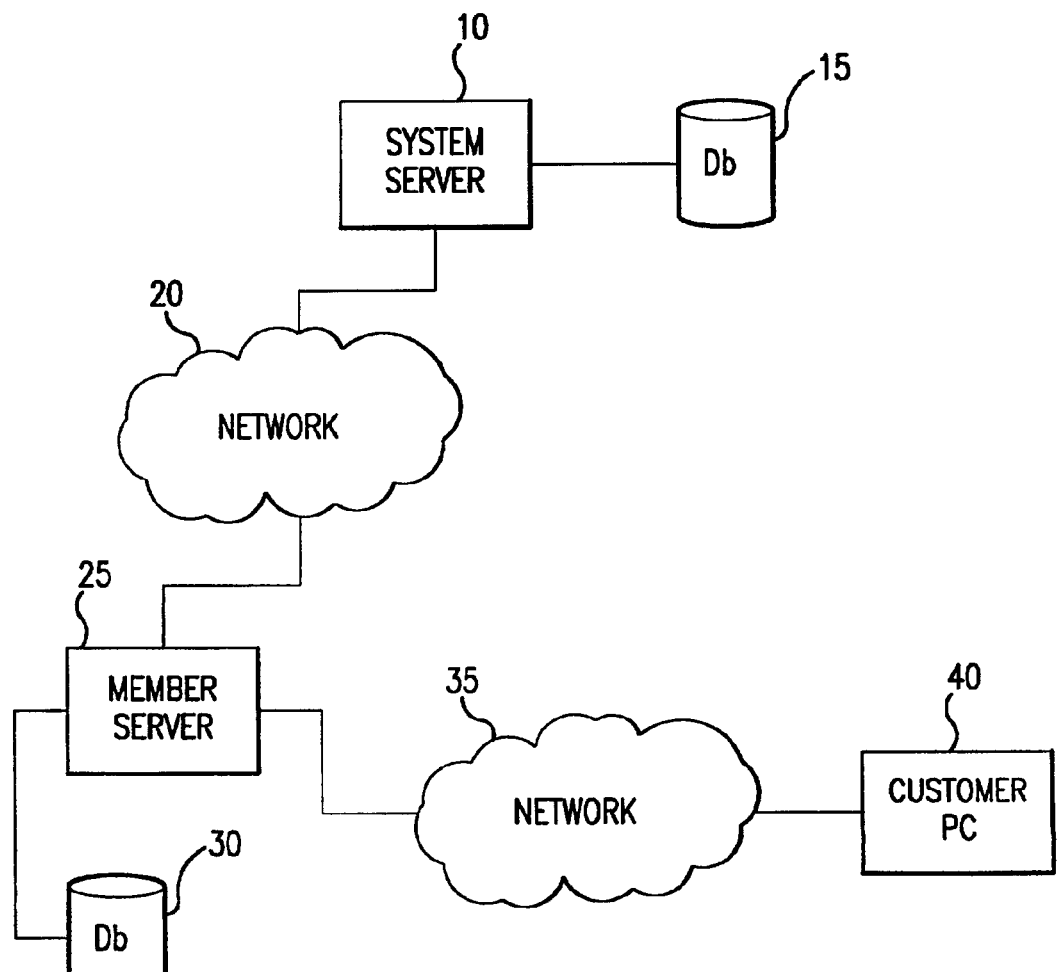
FIG. 1A is a system diagram showing main hardware components of a system of a preferred embodiment of the present invention.

A preferred embodiment of the present invention comprises a computer system that has at least the following components (see FIG. 1A): A system server 10 is connected to a system database 15. System server 10 is also connected to a computer network 20, and through computer network 20 connected to a member server 25. member server 25 is connected to a member database 30. Member server 25 is also connected via a computer network 35 to a customer personal computer (PC) 40. In a preferred embodiment, networks 20 and 35 are actually the same network—the Internet.

A preferred embodiment of the present invention further comprises a web application on an Internet server 10 at a system web site that receives a redirected URL from an established member's web site server 25 and displays a Policy Notice over the Internet 35 to a customer via a customer PC 40 that has been redirected to the system web site. The presented Policy Notice is preferably linked to displays comprised of privacy laws and insurance policies that apply to the customer's country of residence, as well as an agreement provided by the member agreeing to protect the consumer's personal information in accordance with the privacy laws of the country of residence of the consumer. The customer reads the agreement and agrees or disagrees to provide his personal information (or acknowledges that the member will receive his personal information—for clarity of explication, the subsequent description does not continue to make this point, since those skilled in the art will recognize where the term "acknowledge" can be used as an alternative to "accept" or "agree"). If the customer agrees, then he presses an "Agree" button (or otherwise indicates agreement, as known in the art); if the customer disagrees, he presses a "Reject" button. The results are returned from the system web site server 10 to the member's web site server 25 in the form of a hash code. If the customer pressed the "Agree" button, the member's web server 25 presents a form requesting personal information. When the customer submits this completed form to the member's web server 25, a copy of the information is sent to the system web server 10 and a copy is submitted to the member's database 30 for further processing. Also the hash code is sent back to the system web server 10 and database 15 for future tracking.

The hash code is a composite key that the system web server 10 uses to track what information was presented and agreed upon. This key preferably contains at least the following information: (1) member data; (2) date & time; (3) reference to policy notice; and (4) customer IP address.

Figure 1B:
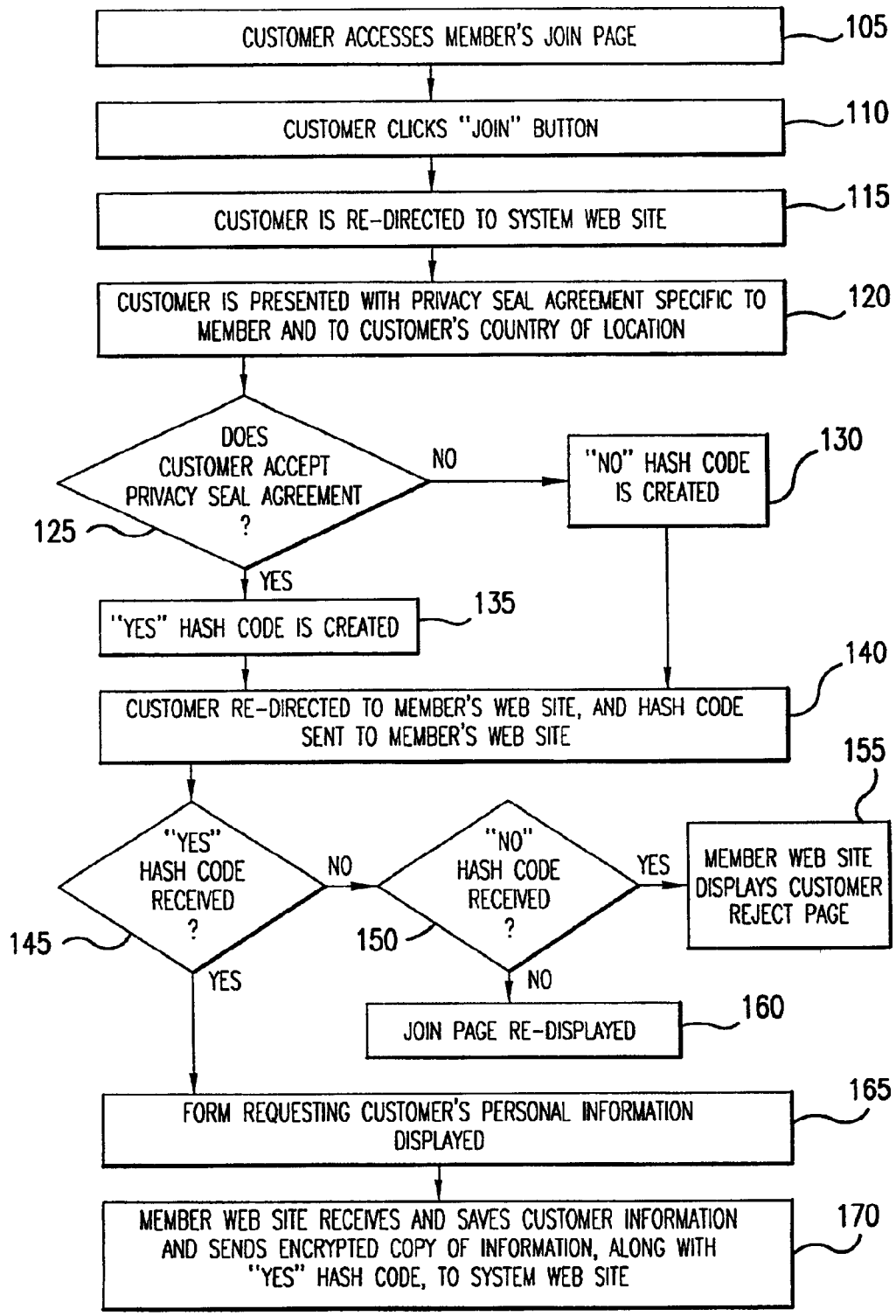
FIG. 1B is a flow diagram illustrating steps of a method of a preferred embodiment of the present invention.

FIG. 1B illustrates steps of a preferred method embodiment of the present invention. At step 105 a customer accesses a member's join page (a web site page that enables a customer to register for or otherwise use the member's services). At step 110, the customer clicks a "Join" button (or otherwise indicates an interest in becoming a customer (i.e., provide personal information)). At step 115 the customer is re-directed to the web site and server 10 of a preferred system. The member web server 25 sends a Member ID and the customer's IP address to the system web server 10 (see the process diagram of FIG. 3, step (a)).

Figure 2:
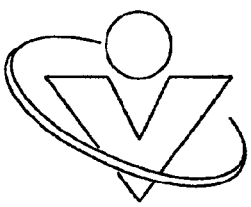
FIG. 2 depicts a preferred Policy Notice web page.

At step 120 the customer is presented with a Policy Notice agreement that is specific to the member and to the customer's country of location (as determined by the customer's URL). The Policy Notice agreement preferably comprises information regarding the member's policies regarding collection and usage of personally-identifiable information (PII). In a preferred embodiment, the customer is first presented with a Privacy Policy Summary page (see FIG. 2), which summarizes terms of the agreement. The customer can then access further details, or the complete privacy policy, by clicking on appropriate links in the Privacy policy Summary page.

If the customer accepts the terms of the agreement, the customer preferably clicks an "Agree" button (or otherwise indicates agreement (or acknowledgment)), and if the customer does not accept the terms of the agreement, the customer clicks a "Reject" button (or otherwise indicates a desire to reject the agreement). At step 125 the system checks whether the customer has indicated acceptance or rejection of the agreement. If the customer has indicated rejection of the agreement, then at step 130 the system creates a "No" hash code (a hash code that indicates that the customer has rejected the agreement). If the customer has indicated acceptance of the agreement, then at step 135 the system creates a "Yes" hash code (a hash code that indicates that the customer has accepted (or acknowledged) the agreement). Each hash code also comprises other data, discussed below. See step (b) in FIG. 3.

Once the customer has indicated acceptance and at step 135 a "Yes" hash code has been created, or the customer has indicated rejection and at step 130 a "No" hash code has been created, at step 140 the customer is re-directed to the member's web site and the hash code created at step 130 or 135 is sent to the member's web site.

At step 145 the member's web site checks whether a "Yes" hash code was received from the system web site. If so, then at step 165 the member's web site displays a form that requests the customer's personal information, and the customer submits the requested information. At step 170 the member web site receives and stores the customer's information (see steps (c) and (f) in FIG. 3), and sends an encrypted copy of the customer's information to the system web site, along with the received "Yes" hash code (see step (d) in FIG. 3). This information is stored in a customer data store of the system (see step (e) in FIG. 3).

If, at step 145 the member's web site determines that a "Yes" hash code was not received, at step 150 the member's web site checks whether a "No" hash code was received. If a "No" hash code was received, then at step 155 the member's web site displays a page indicating to the customer that permission to join cannot be granted. If at step 150 the member's web site does not determine that a "No" hash code was received, the customer is re-directed to the join page.

The preferred system web site web server 10 is preferably an enterprise-class web server with an enterprise-class database to support the web application (for example, Microsoft Internet Information Server (IIS) hosted on a Windows NT server). The server preferably has an identical twin configured into a load-balanced cluster. This ensures redundancy, to give adequate support to members and customers.

When customer data is returned to the system web server 10, the data is stored in the preferred database 15. The hash code, surname, and first name index the database 25. A preferred database is Oracle 8I, or its functional equivalent. Oracle is a recognized leader in relational database systems and has specific solutions concerning Internet database applications. The database 25 preferably has at least the following six tables:

(1) Member Details—This table holds member information. It is used to track member details and billing information.

(2) Global Privacy Laws—This table holds privacy laws that are indexed by the country that they apply to. The table is referenced each time the Policy Notice is constructed.

(3) Global Insurance Policies—This table holds insurance policies that have been agreed to by each member.

(4) Global IP Register—This table is used to resolve an customer's IP address into a location. This is useful when the system initially presents a Policy Notice.

(5) Activity Log—This table holds all activity events that occur within the application on the system web site.

(6) Customer Privacy Information—This table holds all customer information that is submitted from member web sites.

(7) Member Privacy Policy Summary.

Preferred system hardware comprises: (1) dual web servers; (2) a database server; and (3) a backup tape drive. Preferred software comprises: (1) Oracle 8I; and (2) a web server application.

Figure 4:
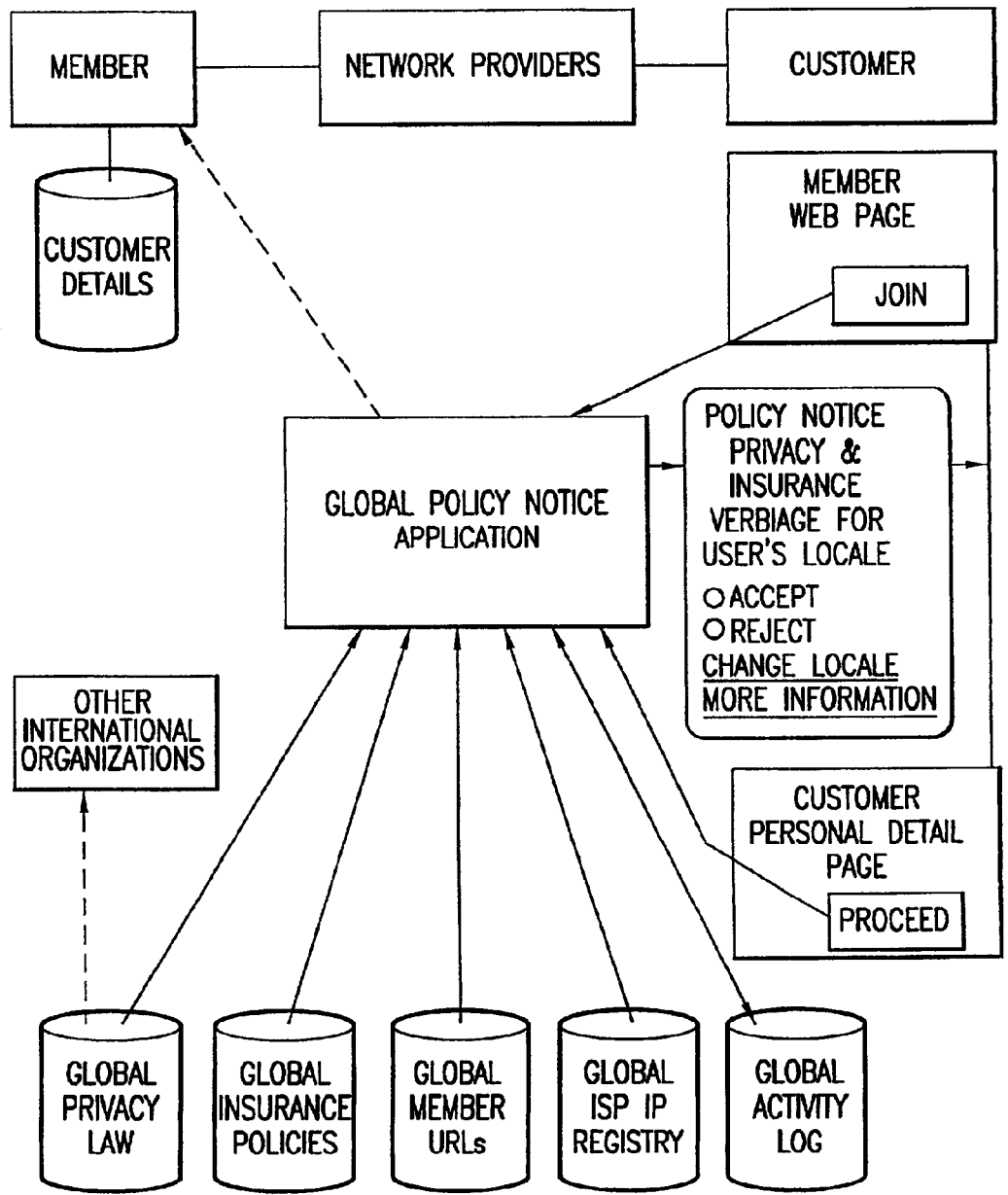
FIG. 4 is in application diagram for a preferred embodiment.
Figure 5:
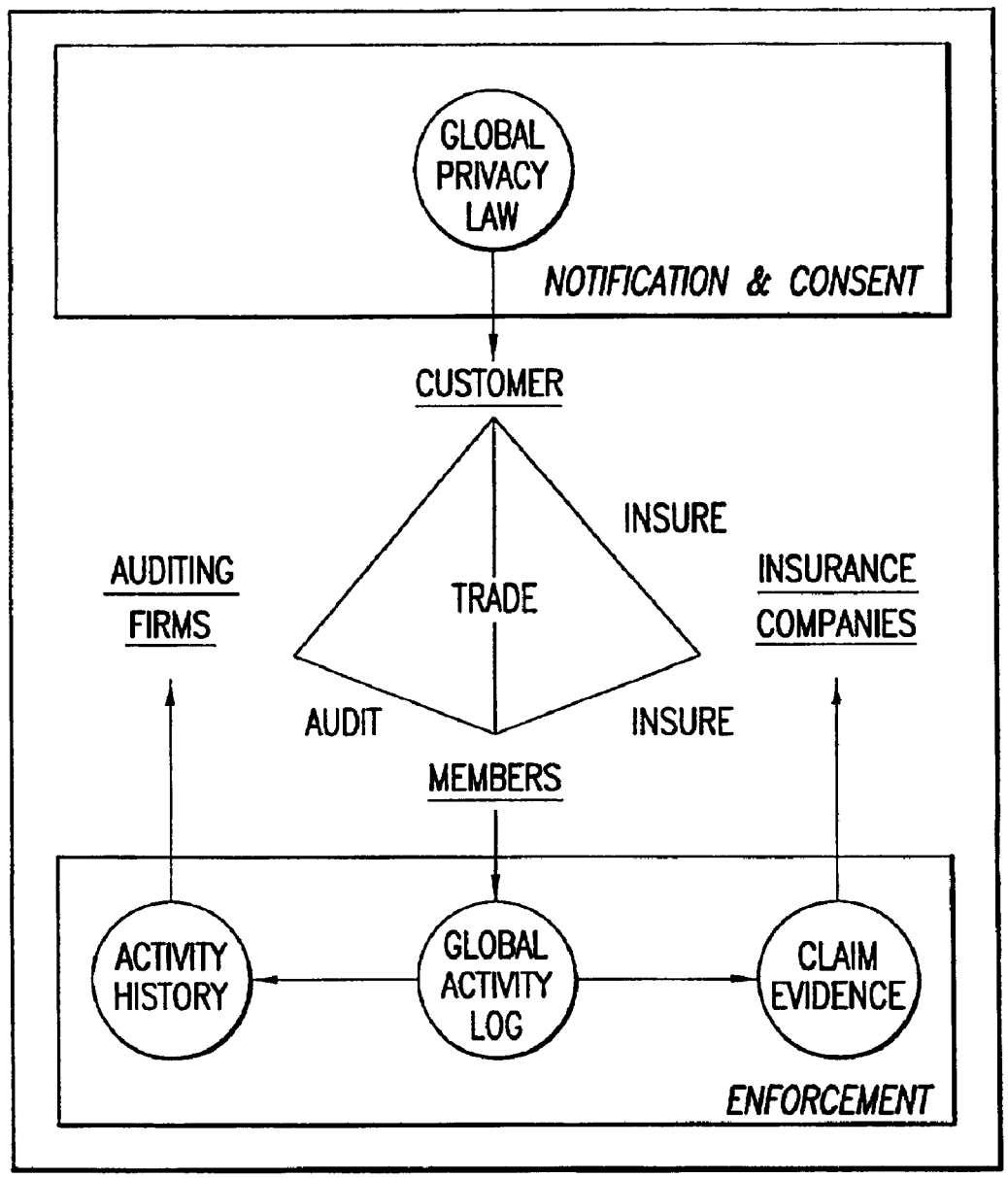
FIG. 5 is a business diagram for a preferred embodiment.
Figure 6:
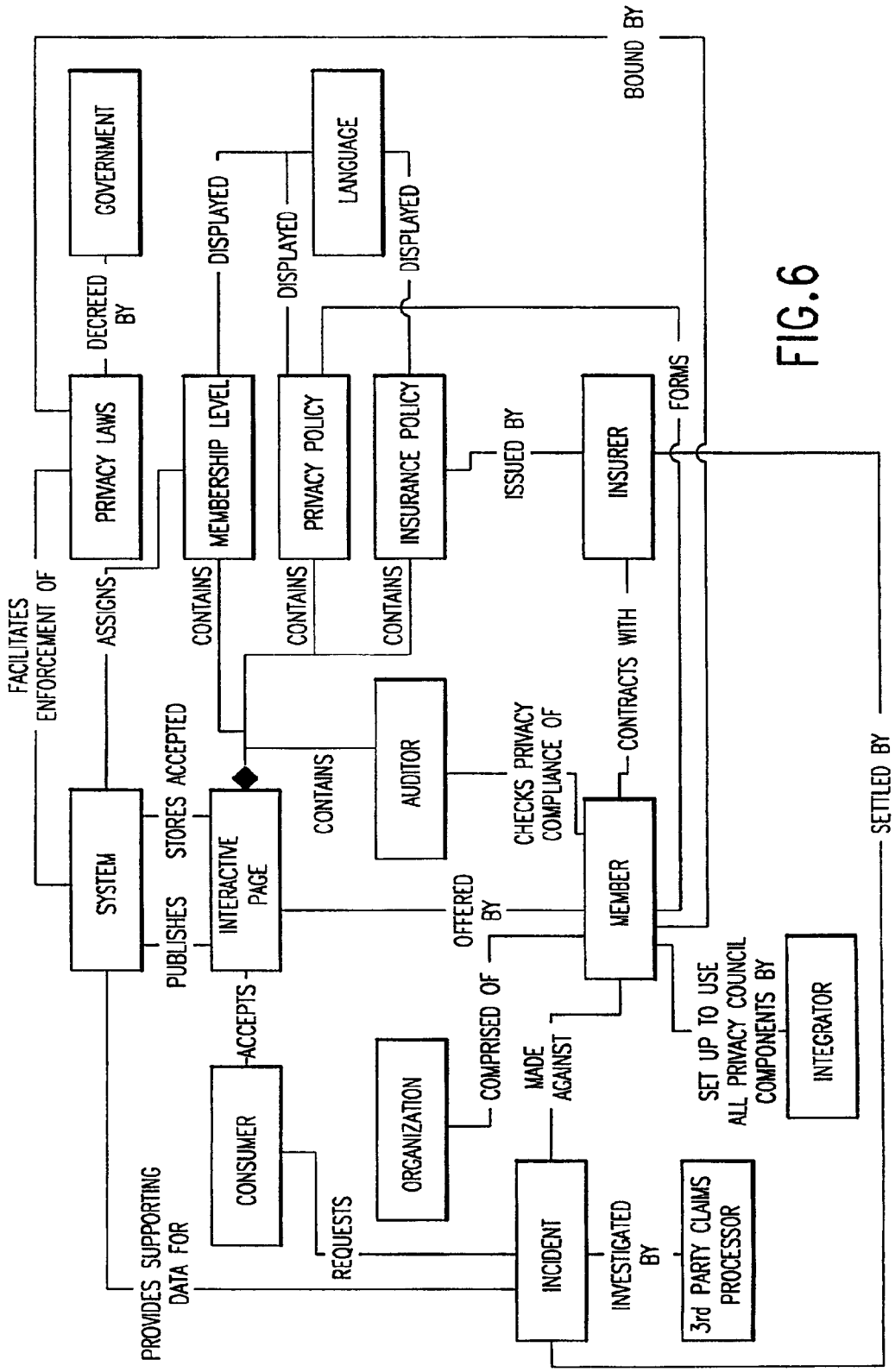
FIG. 6 depicts a component diagram of a preferred embodiment.

A preferred embodiment of the present invention comprises a Global Policy Notice Application (GPNA) to inform a consumer that member organizations adhere to the prevailing privacy laws of the country protecting the consumer's personal information. A preferred Policy Notice system: (1) displays a policy notice to a consumer in multiple languages supported by the member organization; (2) is backed by insurance; (3) adheres to privacy laws of the land that are enforced by stringent audit checks and verification by the leading auditors; (4) has proactive notification to members mandating them to delete consumers' private information from their data store upon expiration; (5) requests consent from the consumer in every relevant decision; and (6) provides functionality that allows a consumer to file a claim and have it processed by a third party investigating agency. See FIG. 4.

A member has to make minimal changes in order to integrate the system application into the member's web site environment. The changes primarily involve (1) a redirected URL from the customer join page of the member's site and (2) a duplicate form submission HTTP request from the personal detail page of the member's web site. The member's site server 25 must also accept the hash code that is returned from the system web server 10, and pass that hash code back to the system web server 10 with personal information that was gathered from the consumer.

The following is a list of functional elements comprised in software of a preferred system:

(1) A front end that allows the system to store and maintain member information and that includes the following functionality: (A) Add Member Data, preferably including the following elements:

| | |
|---|---|
| Name | Default Country |
| Organization | Default Language |
| Address | Default URL |
| City | IP Address Pool |
| State | Volume Thresholds |
| Country | Audit Period |
| Postal Code | Apply Date |
| Contact Name | Effective Date |
| Email Address | Discontinue Date |
| Phone | Status |

(a "Volume Threshold" is an expected number of monthly views); (B) Change Member Data for the above elements; (C) Discontinue Member; (D) Associate Auditor for Member; (E) Change Auditor for Member; (F) Discontinue Auditor for Member; (G) Associate Insurer for Member; (H) Change Insurer for Member; (I) Discontinue Insurer for Member; (J) Add Insurance Policy for Member, preferably including the following elements:

| | |
|---|---|
| Insurance Policy ID | Policy Overview Text |
| Insurer ID | Policy Detail Text |
| Country Code | Effective Date |
| Language Code | Discontinue Date |
| Policy Amount | Status |

(K) Change Insurance Policy for Member for the above elements; (L) Discontinue Insurance Policy for Member; (M) Add Privacy Policy for Member, preferably including the following elements:

| | |
|---|---|
| Country Code | Duration |
| Language Code | Effective Date |
| Policy Overview Text | Discontinue Date |
| Policy Detail Text | Status |

(N) Change Privacy Policy for Member for the above elements; (O) Discontinue Privacy Policy for Member; (P) Add Language for Member; (Q) Discontinue Language for Member; (R) Associate System Membership Level; (S) Change System Membership Level; and (T) Discontinue System Membership Level.

(2) A front end that allows the system to store and maintain Insurer information that includes the following functionality: (A) Add Insurer Data, preferably including the following elements:

| | |
|---|---|
| Name | Contact |
| Address | Email Address |
| City | Phone |
| State | Effective Date |
| Country | Discontinue Date |
| Postal Code | Status |

(B) Change Insurer Data for the above elements; and (C) Discontinue Insurer.

(3) A front end that allows the system to store and maintain auditor information that includes the following functionality: (A) Add Auditor Data, preferably including the following elements:

| | |
|---|---|
| Name | Contact |
| Address | Email Address |
| City | Phone |
| State | Effective Date |
| Country | Discontinue Date |
| Postal Code | Status |

(B) Change Auditor Data for the above elements; and (C) Discontinue Auditor.

(4) A front end that allows the system to store and maintain organization information that includes the following functionality: (A) Add Organization Data, preferably including the following elements:

| | |
|---|---|
| Name | Contact |
| Address | Email Address |
| City | Phone |
| State | Effective Date |
| Country | Discontinue Date |
| Postal Code | Status |

(B) Change Organization Data for the above elements; and (C) Discontinue Organization.

(5) A front end that allows the system to store and maintain Integrator information that includes the following functionality: (A) Add Integrator Data, preferably including the following elements:

| | |
|---|---|
| Name | Contact |
| Address | Email Address |
| City | Phone |
| State | Effective Date |
| Country | Discontinue Date |
| Postal Code | Status |

(B) Change Integrator Data for the above elements; and (C) Discontinue Integrator.

(6) A front end that allows the system to store and maintain 3rd Party Claims Processor information that includes the following functionality: (A) Add 3rd Party Claims Processor Data, preferably including the following elements:

| | |
|---|---|
| Name | Contact |
| Address | Email Address |
| City | Phone |
| State | Effective Date |
| Country | Discontinue Date |
| Postal Code | Status |

(B) Change 3rd Party Claims Processor Data for the above elements; and (C) Discontinue 3rd Party Claims Processor.

(7) A front end that allows the system to store and maintain language information that includes the following functionality: (A) Add Language; and (B) Discontinue Language.

(8) A front end that allows the system to store and maintain Interactive Policy Notice Page Layout Version information that includes the following functionality: (A) Add Interactive Policy Notice Page Layout Version; and (B) Discontinue Interactive Policy Notice Page Layout Version.

(9) A front end that allows the system to store and maintain Privacy Laws deemed applicable by Governments.

The following is a list of steps included in performing a method of a preferred embodiment:

(10) Display a System Interactive Policy Notice Page with Member information, Insurance Policy information, Privacy Policy information, System Membership Level and Auditor information in the language of the consumer.

(11) Display a System Interactive Policy Notice Page for a selected country.

(12) Display a System Interactive Policy Notice Page in a selected language.

(13) Display a Member Insurance Policy in greater detail.

(14) Display a Member Privacy Policy in greater detail.

(15) Pass control back to the member application if the consumer has accepted the System Interactive Policy Notice Page conditions. Prior to passing control back, generate an encrypted, unique Interactive Policy Notice Page Identification (hash code), preferably comprised of the following elements once the consumer has accepted the System Interactive Policy Notice Page:

| | |
|---|---|
| Member Identification | Date/Time Stamp |
| Country Identification | Expiration Period |
| Language Identification | Layout Version |
| Consumer IP address | Check Sum |

(16) Pass control back to the member application if the consumer (customer) has declined the System Interactive Policy Notice Page.

(17) Member application sends consumer privacy information comprised of the following to the system: (A) Key: Unique Interactive Policy Notice Page ID (encrypted with system key); (B) Searchable Data: (i) Member ID (encrypted with system key); (ii) Consumer Name (encrypted with system key); (iii) Address Line (encrypted with system key); (iv) Country Code (encrypted with system key); (v) Postal Code (encrypted with system key); and (vi) Expiration Date (encrypted with system key); and (C) Private Consumer Information: Consumer's Private Data (encrypted with member key).

(18) Receive and store on the system data store consumer privacy information comprised of the following: (A) Key: Unique Interactive Policy Notice Page ID (encrypted with system key); (B) Searchable Data: (i) Member ID (encrypted with system key); (ii) Consumer Name (encrypted with system key); (iii) Address Line (encrypted with system key); (iv) Country Code (encrypted with system key); (v) Postal Code (encrypted with system key); and (vi) Expiration Date (encrypted with system key); and (C) Private Consumer Information: Consumer's Private Data (encrypted with member key).

(19) Add consumer privacy information comprised of the following comma-delimited data elements when members encounter problems when interfacing online with system (the delimited data is copied to the system data repository): (A) Key: Unique Interactive Policy Notice Page ID (encrypted with system key); (B) Searchable Data: (i) Member ID (encrypted with system key); (ii) Consumer Name (encrypted with system key); (iii) Address Line (encrypted with system key); (iv) Country Code (encrypted with system key); (v) Postal Code (encrypted with system key); and (vi) Expiration Date (encrypted with system key); and (C) Private Consumer Information: Consumer's Private Data (encrypted with member key).

(20) A front end that allows the system to add data regarding consumer incidents, preferably including the following elements: (A) Initiator Name; (B) Initiator Address; (C) Initiator Country ID; (D) Initiator Postal Code; (E) Initiator Contact Data; (F) Incident Name; (G) Incident Address Line 1; (H) Incident Country Code; (I) Incident Postal Code; (J) Incident Member; (K) Incident Time-frame; (L) Incident Type; and (M) Incident Detail.

In addition, a System Interactive Policy Notice Page is generated for the initiator of the incident. Upon acceptance the Interactive Policy Notice Page is stored on the system data store of consumer privacy information—see (12) above.

(21) Provide supporting incident data to a Third Party Claim Processor, Auditor, or Consumer. The supporting data is preferably a combination of the following: (A) Raw data from the Privacy Data Store; and (B) Regenerated Interactive Policy Notice Page.

(22) A front end that allows the system to update the resolution of consumer-filed incidents including the following elements: (A) Resolution Date; (B) Resolution Text; and (3) Resolution Code.

(23) Notify members of expired Interactive Policy Notice Pages.

(24) Process member acknowledgment of expired Interactive Policy Notice Page.

(25) Produce sampling of Interactive Policy Notice Page data by member for the corresponding auditor. The data comprises a list of active Interactive Policy Notice Pages, expired Interactive Policy Notice Pages, or both. The data may also relate to specific Interactive Policy Notice Pages.

(26) Archive Member Interactive Policy Notice Page Data.

(27) Validate received Member Interactive Policy Notice Page Data for the following: (A) Valid Interactive Policy Notice Page ID; (B) Unique Interactive Policy Notice Page ID; (C) Valid Member ID; (D) Date Time sequential order by Member ID within tolerance; (E) data is being received from members within expected volume thresholds; (F) Validate Expiration Date—valid date—calculate date and compare to member date; (G) Consumer's private data is populated and >x number of bytes; (H) Searchable information is provided (Consumer Name, Address Line 1, Country Code, Postal Code, and Expiration Date).

(28) Generate Consumer Privacy Information usage volume statistics by Date, Member, Country, and Language.

(29) Receive and store Member Interactive Policy Notice Page request statistics by Member from a Caching Mechanism.

(30) Create a sample compliance executable to run at the member site that will check all System Interactive Policy Notice Pages for and report on the following: (A) Valid Interactive Policy Notice Page ID; (B) Unique Interactive Policy Notice Page ID; (C) Expiration Date of the Interactive Policy Notice Page greater than current date; and (D) Expiration Date is correctly calculated.

(31) Create a sample compliance executable to run at the member site that will process for target Interactive Policy Notice Page IDs. If the Interactive Policy Notice Page ID has expired and the Interactive Policy Notice Page exists on the member database, then an exception is generated. If the Interactive Policy Notice Page ID is active and the Interactive Policy Notice Page exists on the member database, encrypt the member private data and compare it to the consumer private data store of the system.

(32) Maintain and distribute Interactive Policy Notice Page Content.

(33) Implement a third party reporting tool that will generate a report of volume statistics by Date, Member, Country, Language.

(34) Provide a mechanism that will verify the authenticity of the Interactive Policy Notice Page Emblem when selected. Provide a link to a list of valid system members.

(35) Publish a System Installation/Integration document. Included in this document is the requirement that the member will ensure that the System Interactive Policy Notice Page is generated before the member stores any consumer private data.

A preferred embodiment uses the UNIX operating system (OS) for running the GPNA. UNIX is a proven OS used by many enterprise systems throughout the world.

Preferred hardware: (A) at each system server (each Internet Database Connector (IDC)): (i) Sun Microsystems E-250 Work group server for real time database updates; (ii) Sun Microsystems E-250 Work group server for Weblogic application server; (iii) Sun Microsystems Ultra—60 Workgroup server for Caching services with maximum RAM that is allowed in the system configuration; (iv) 2 Sun Microsystems Ultra—60 Workgroup servers for Netscape Web Server; and (v) a tape Jukebox for archiving and backup.

(B) At system data center: (i) Sun Microsystems Ultra—60 Workgroup server for content distribution (Network Authentication and Firewall); (ii) Sun Microsystems E-250 Work group server for Weblogic application server for processing claims and partner's updates; (iii) Sun Microsystems Ultra—60 Workgroup server for Netscape Web Server for claims processing and internal traffic; (iv) Sun Microsystems E-250 Work group database server for archiving and retrieving Policy Notice data and saving claims and partner's updates; and (v) a tape Jukebox for archiving and backup.

Preferred software for implementing the GPNA: (A) Deployment Environment: (i) an application server i(WebLogic) with clustering software; (ii) a relational database (Oracle); (iii) Inktomi's Content Distributor; (iv) SSL package (Baltimore's J/SSL); (v) Certificate server with digital signature software; (vi) Firewall (Check Point); (vii) Host-based intrusion detection (Intruder Alert from Axent technologies); (viii) Caching service (Epic Realm); (ix) Resonate Dispatch (Global and Central) for intelligent routing; and (x) Network Authentication server for connection between the content distributor and the caching service (Cisco Secure Access control Server); and (B) Development Environment: (i) a modeling tool (Rational Rose); (ii) configuration management system (ClearCase); (iii) testing tool (Silknet Segui); (iv) IDE (Visual Cafe); (v) Web authoring tool (DreamWeaver); (vi) Java Server Pages and Servlets; (vii) Web Server (Netscape); (viii) Java 1.2.x and JSDK; (ix) WebLogic Application Server; and (x) Oracle RDBMS.

Figure 7A:
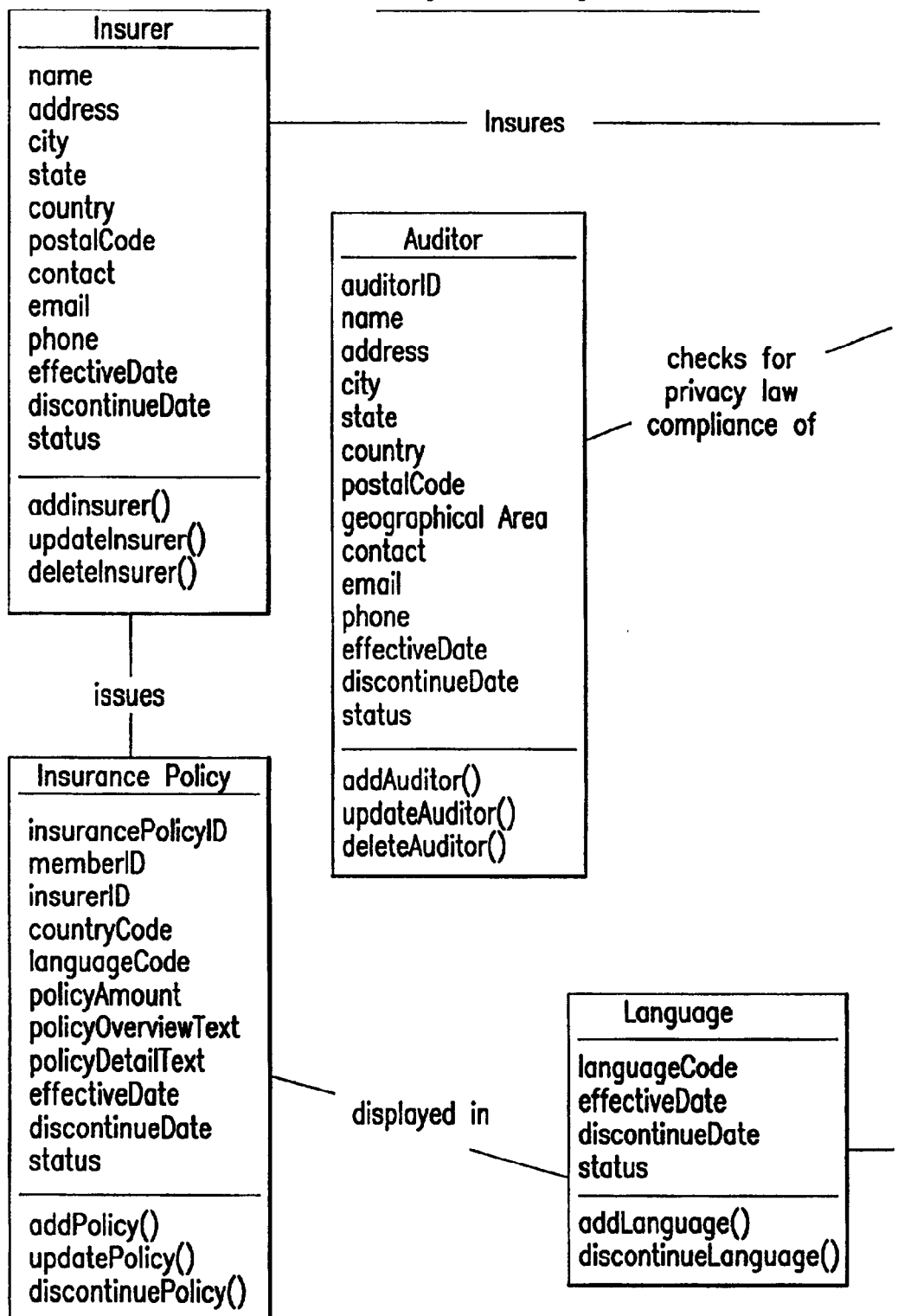
Figures 1, 7A:
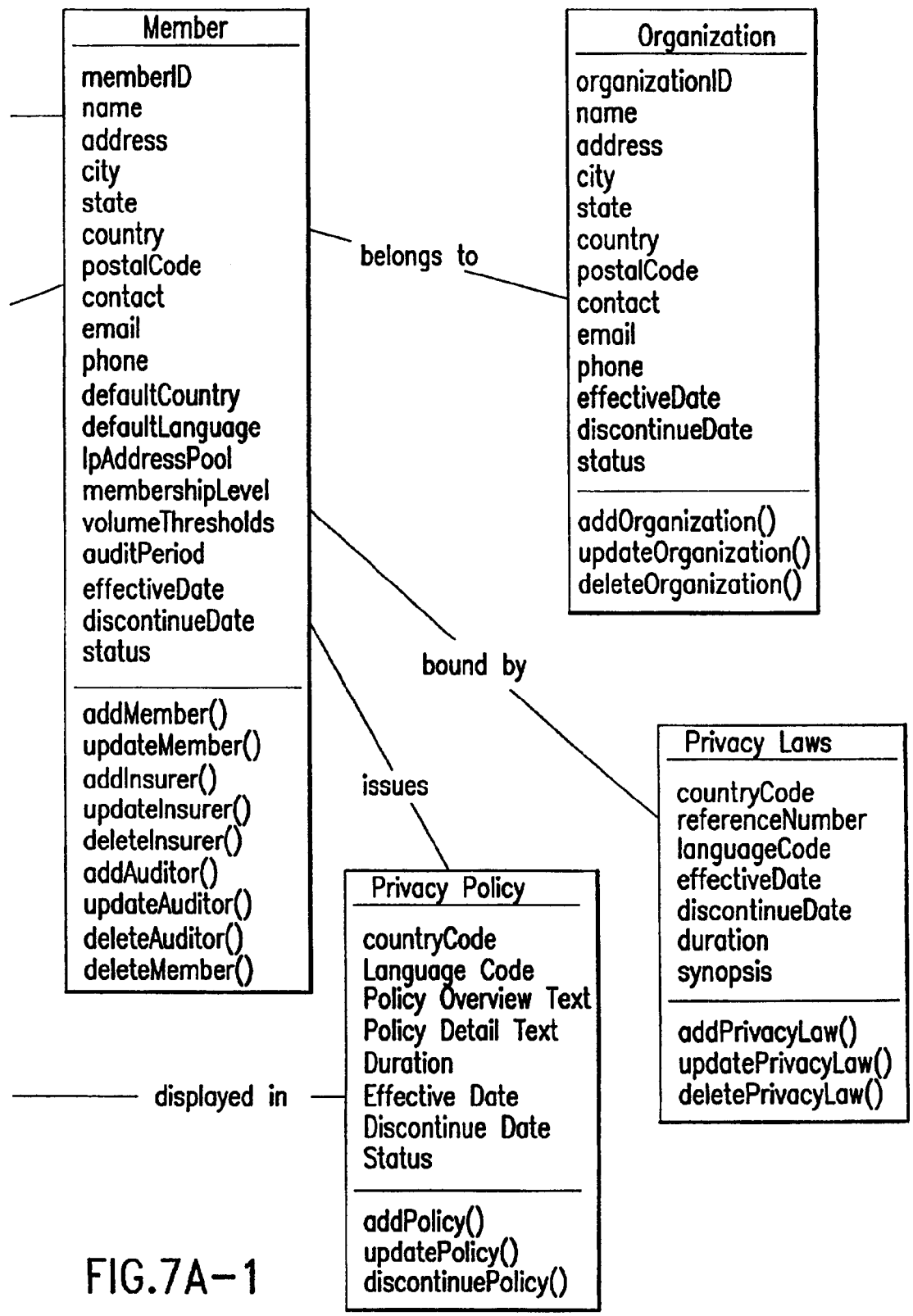
Figure 7B:
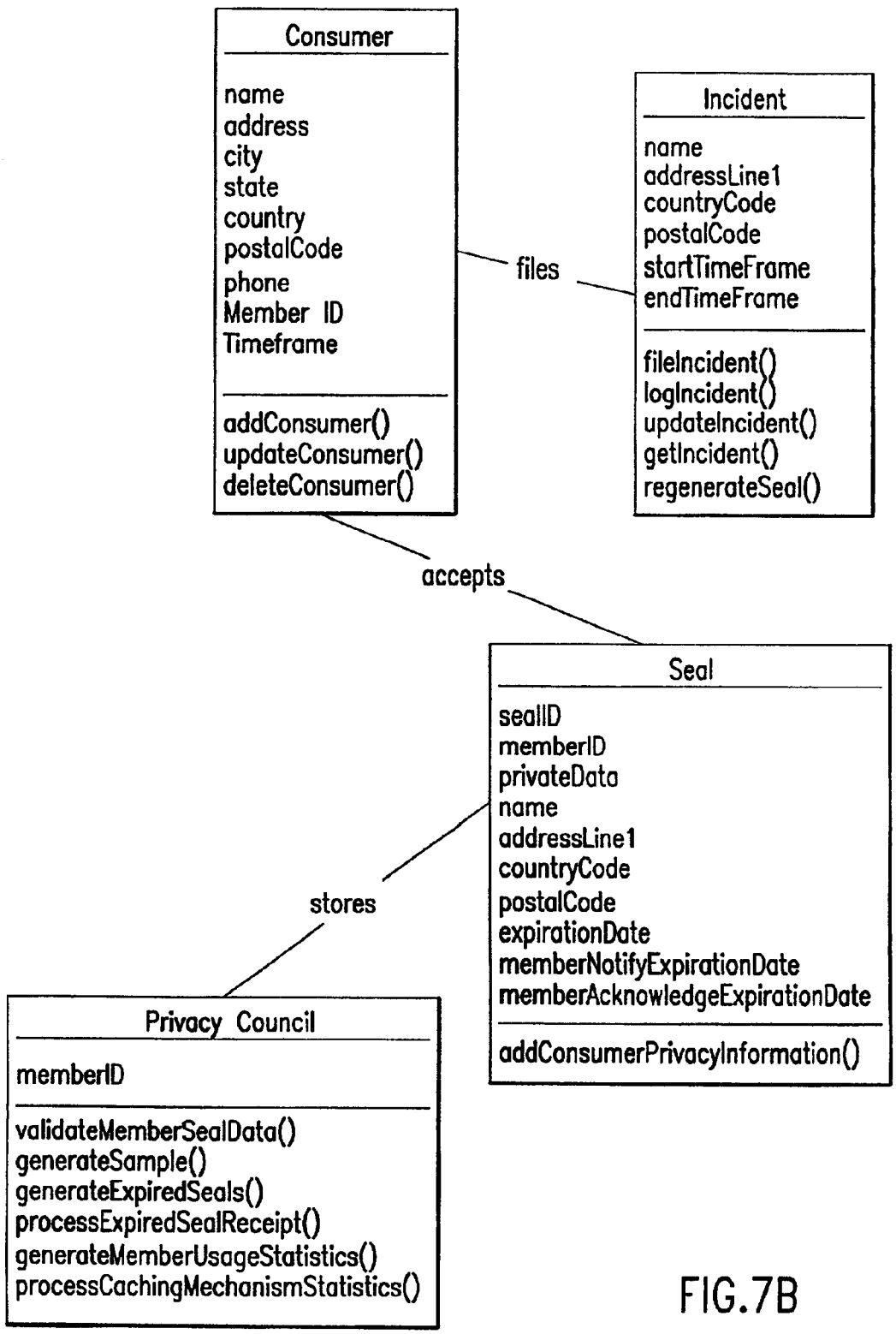
Figure 8A:
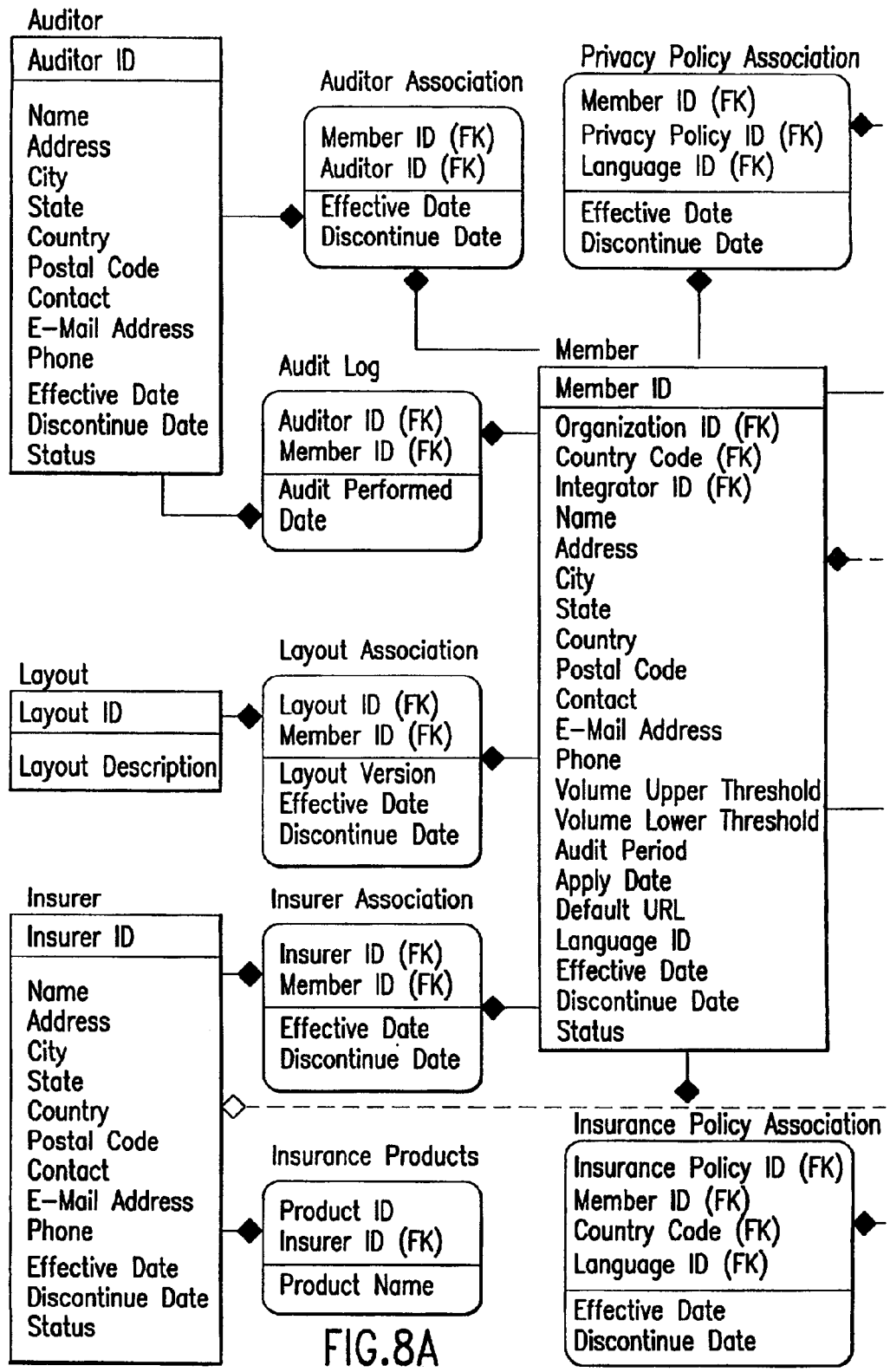
FIGS. 8A and 8B comprise a database design diagram for a preferred embodiment.
Figures 1, 8A:
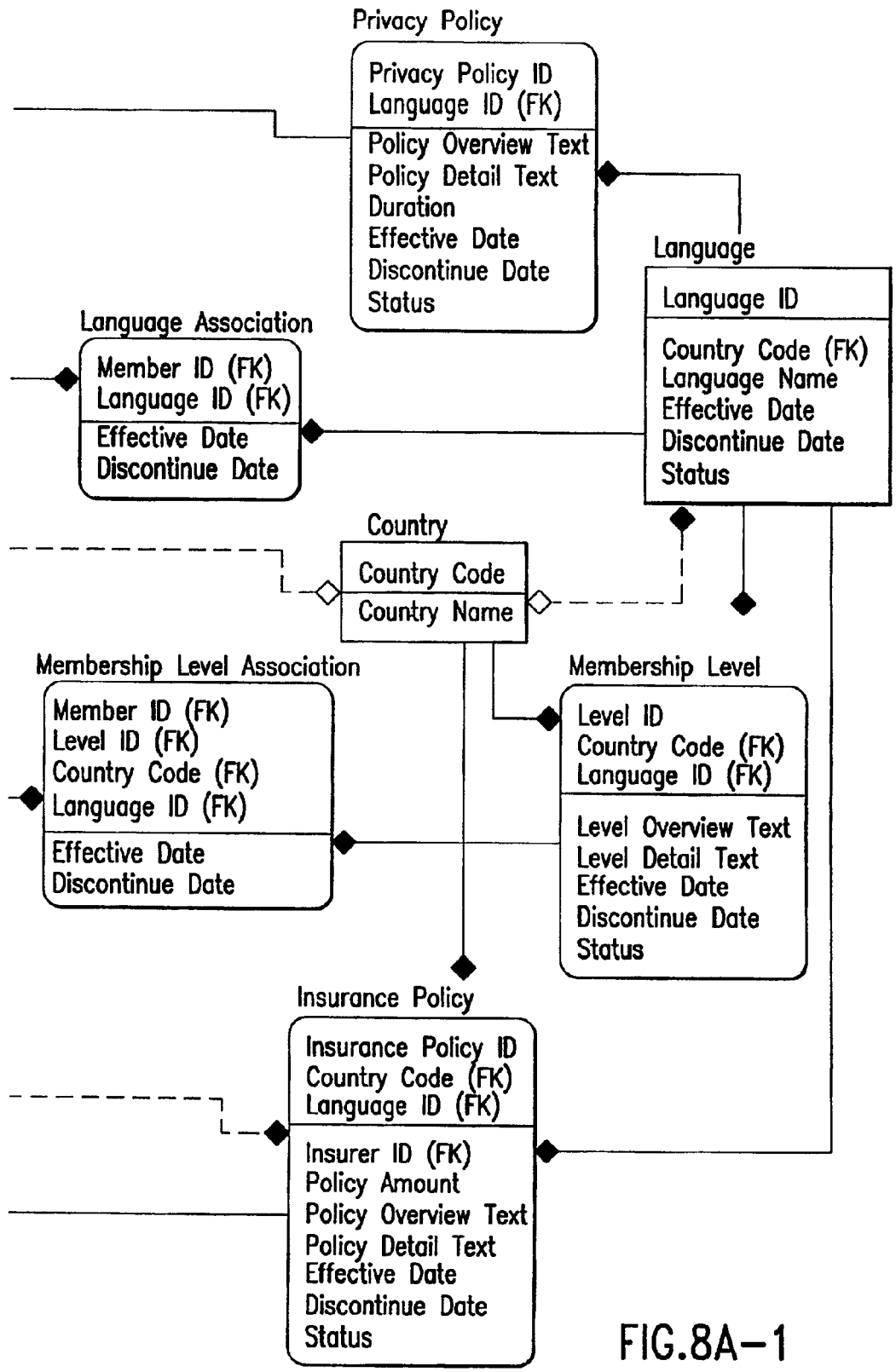
Figure 8B:
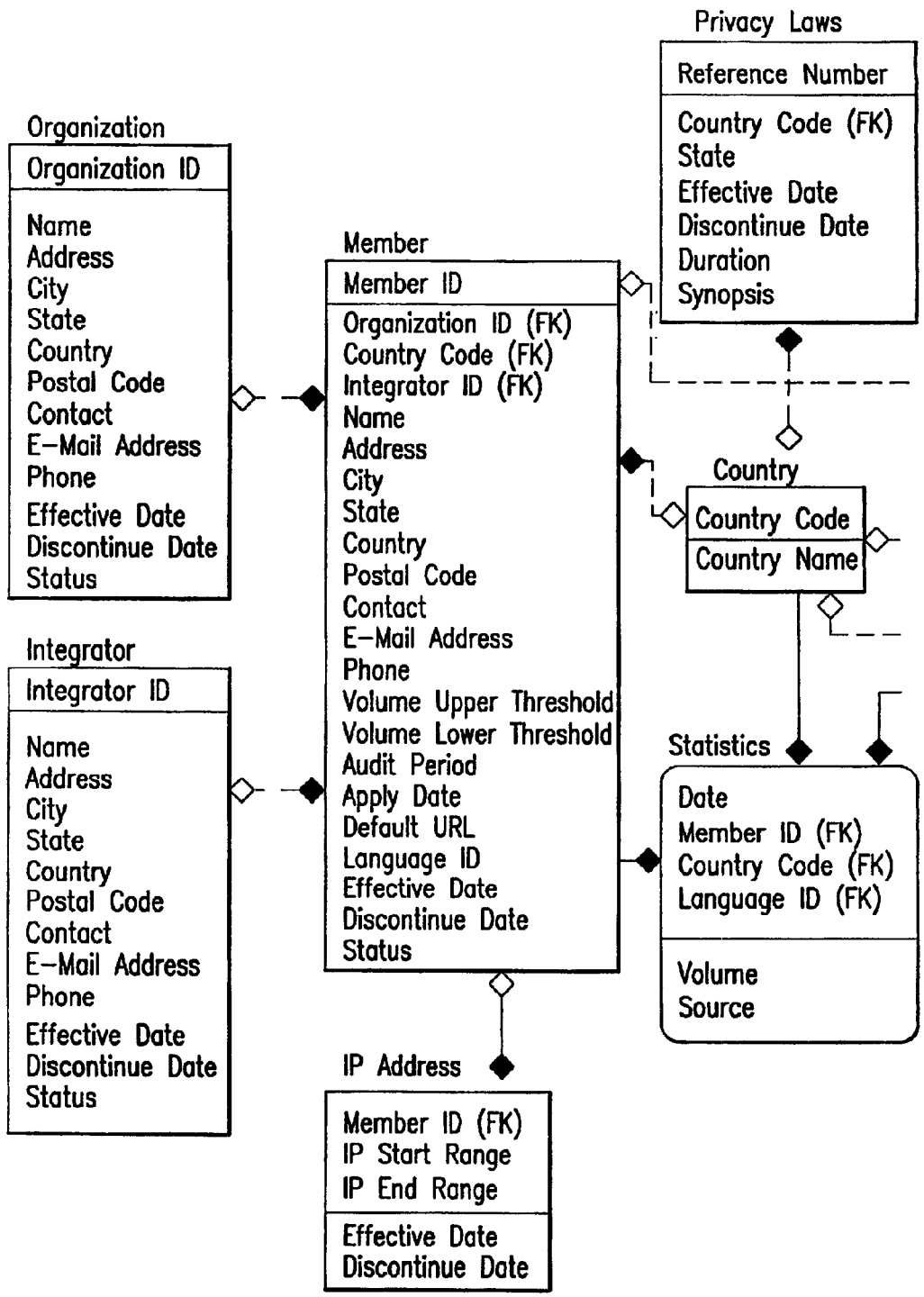
Figures 1, 8B:
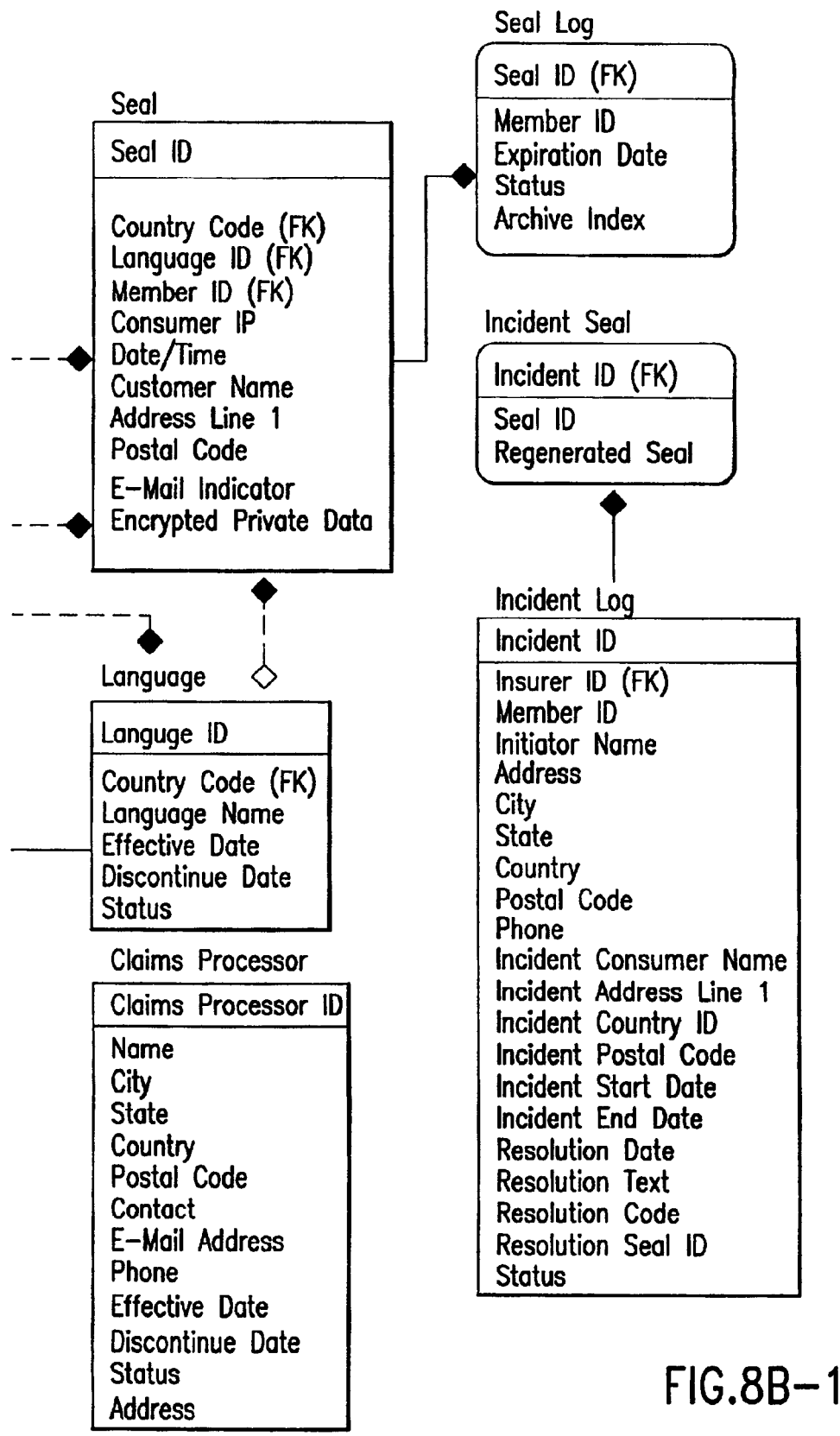

FIGS. 7A, 7B, and 7C comprise a design class diagram for a preferred embodiment. FIGS. 8A and 8B comprise a database design diagram for a preferred embodiment. The term "Seal" should be read as synonymous with "Policy Notice."

Hosting: Internet Data Centers located world-wide for regional application hosting (Exodus Communications or Digital Island).

Network Infrastructure: (A) a dedicated connection from the content distributor and caching service; and (B) a high speed (T3) Internet connection to the system web server.
Security For the following problems, the corresponding remedies are preferred for implementing a secure solution for the GPNA.

(1) Prevent unauthorized use of the Policy Notice credentials: one of the most important objectives of the system is to maintain the integrity of its member organizations subject to a periodic auditing process. Only those member organizations that pass through this rigorous audit process are granted Policy Notices. Hence there is a realistic possibility that some impostors might falsely claim to have membership with the system, may plagiarize a copy of the Policy Notice (image), or otherwise mislead an unsuspecting consumer with a set of false credentials.

Remedy: The image of the member's Policy Notice credentials is dynamic—preferably an applet that can be validated online with the GPNA. The web site of the system also preferably maintains a list of up-to-date member organizations with their expiration dates.

(2) Protect sensitive information sent or received over the Internet: The Internet is a public network of computers and as such any communication over it is unsafe and subject to possible eavesdropping. Thus, a safe way to exchange data is to deploy a secure private network between members and the system. But installing such a network is prohibitively expensive and would be a roadblock to bringing new members into the system.

Remedy: Every message is encrypted/decrypted using the Public Key Infrastructure (PKI) solution. Asymmetric key pairs of at least 128-bit value is used for encryption/decryption. Once encrypted, the message is sent using the Secure Socket Layers (SSL) protocol over the Internet. SSL protocol initiates the conversation between the two parties with a handshake by exchanging the encryption keys while verifying their digital certificates that contain a public key, the domain name ("DN") of the user, the DN of the issuer, serial number, validity period, digital signature, and its finger print (hash value). In summary, this secure communication involves the following steps: (A) authenticating end systems (server, client); (B) distributing the encryption keys; and (C) encrypting data sent between applications.

(3) Maintain an audit trail and log: Recent attacks on popular web sites by hackers pose a serious threat to the integrity of the enterprise systems especially in the B2B arena. We need to establish a mechanism such that every transaction recorded in the system should be traceable.

Remedy: The preferred system maintains an audit trail and log for all critical transactions.

While the embodiments shown and described herein are fully capable of achieving the objects of the subject invention, it is evident that numerous alternatives, modifications, and variations will be apparent to those skilled in the art in light of the foregoing description. These alternatives, modifications, and variations are within the scope of the subject invention, and it is to be understood that the embodiments described herein are shown only for the purpose of illustration and not for the purpose of limitation.

What is claimed is:

1. A method for promoting compliance with data protection and privacy laws and regulations relating to the privacy rights of individuals that comprises:
  informing an individual involved in potential disclosure of his/her personal data to an entity that the entity has certified its compliance with approved privacy and data security practices that conform to relevant data protection and privacy laws and regulations covering the use of personal data in at least the individual's or the entity's country of location;
  obtaining the individual's consent to have the entity receive, or acknowledgment that the entity will receive, and use his/her personal data in accordance with a stated policy or with relevant data protection and privacy laws and regulations covering the use of personal data in at least the individual's or the entity's country of location;
  transmitting to the entity data indicating that the individual has been informed of the entity's privacy practices and consented to the entity receiving, or acknowledged that the entity will be receiving, and using his/her personal data in accordance with its stated policy or with relevant data protection and privacy laws and regulations covering the use of personal data in at least the individual's or the entity's country of location;
  receiving from the entity data comprising personal data collected by the entity from the individual;
  storing said personal data received from the entity;
  periodically checking whether the entity has complied with the stated policy or with relevant data protection and privacy laws and regulations covering the use of personal data in at least the individual's or the entity's country of location; and
  wherein the steps of informing the individual, obtaining the individual's consent or acknowledgment, transmitting data to the entity, and receiving data from the entity are performed over a computer network.

2. A method according to claim 1 further comprising the step of informing the individual that the entity is covered by insurance or equivalent risk instrument to protect against risk of loss or harm caused to the individual arising from misuse or loss of the individual's personal data by the entity.

3. A method according to claim 1 wherein said data indicating that the individual has consented to have the entity receive, or acknowledgment that the entity will receive, and the use the individual's personal data comprises data uniquely identifying details relating to the individual's consent.

4. A method according to claim 3 wherein said data indicating that the individual has consented to have the entity receive, or acknowledgment that the entity will receive, and use the individual's personal data and uniquely identifying details relating to the individual's consent is compressed using a hash function.

5. A method according to claim 4 wherein said data received from the entity comprising personal data collected by the entity from the individual includes the data transmitted to the entity uniquely identifying details relating to the individual's consent.

6. A method according to claim 1 performed with a multiplicity of entities and individuals located in a single country.

7. A method according to claim 1 performed with a multiplicity of entities and individuals located in a multiplicity of countries.

8. A method according to claim 1 wherein the individual is informed in an official language of the individual's country of location.

9. A method according to claim 1 conducted as a multi-entity privacy policy certification program requiring member entities to certify compliance with approved privacy standards for the use of personal data of individuals and providing such entities with a policy notice to confirm their approval by, and membership in, the program.

10. A method according to claim 9 wherein the approved standards meet the standards required by the United States, European Union, or other countries or regional organizations.

11. A method according to claim 9 further comprising the step of having audits or other assessments performed upon entities seeking or having membership in the privacy policy certification program to ensure that the entities' privacy practices satisfy the standards approved and required by the program.

12. A method according to claim 11 further comprising the step of having random inspections or audits performed upon member entities to verify compliance by the entities with their approved privacy practices.

13. A method according to claim 12 wherein, upon discovery of a violation of an entity's approved privacy practices, notice thereof and a request for correction are provided to the entity.

14. A method according to claim 13 wherein, upon failure by an entity to comply with a request for correction, the entity's policy notice is extinguished.

15. A method according to claim 14 wherein, upon any continued improper use of the policy notice by the entity an enforcement action to terminate such use is initiated and notice thereof is provided to an appropriate regulatory authority.

16. A method according to claim 1 wherein the data received from the entity comprising the individual's stored personal data includes the time period of the individual's consent or acknowledgment, the length of time that the individual's personal data will be retained, and an option to extend or renew the individual's consent or acknowledgment, if desired notice thereof being provided to the entity and the individual in advance of expiration of the consent.

17. A method according to claim 16 wherein the individual is provided with the option of having the individual's personal data deleted from the entity's data storage upon expiration of the agreement.

18. A method according to claim 2 wherein as prerequisites to membership in the privacy policy certification program, an entity is required to agree to (a) work with providers of insurance or equivalent risk instruments to resolve disputes with individuals, and (b) reimburse providers of insurance or equivalent risk instruments for claims paid to individuals due to violations of the their privacy rights by the entity.

19. A method according to claim 1 where in the computer network is the internet.

20. A system for promoting compliance with data protection and privacy laws and regulations relating to the privacy rights of individuals that comprises:

means for informing an individual involved in potential disclosure of hi/her personal data to an entity that the entity has certified its compliance with approved privacy and data security practices that conform to relevant data protection and privacy laws and regulations covering the use of personal data in at least the individual's or the entity's country of location;

means for obtaining the individual's consent to have the entity receive, or acknowledgment that the entity will receive and use his/her personal data in accordance with a stated policy or with relevant data protection and privacy laws and regulations covering the use of personal data in at least the individual's or the entity's country of location;

means for transmitting to the entity data indicating that the individual has been informed of the entity's privacy practices and consented to the entity receiving, or acknowledgment that the entity will be receiving, and using his/her personal data in accordance with its stated policy or with relevant data protection and privacy laws and regulations covering the use of personal data in at least the individual's or the entity's country of location;

means for receiving from the entity data comprising personal data collected by the entity from the individual;

means for storing said personal data received from the entity;

means for periodically checking whether the entity has complied with the stated policy or with relevant data protection and privacy laws and regulations covering the use of personal data in at least the individual's or the entity's country of location; and wherein a computer network comprises the means for informing the individual, obtaining the individual's consent or acknowledgment, transmitting data to the entity, and receiving data from the entity.

21. A system according to claim 20 further comprising means for informing the individual that the entity is covered by insurance or equivalent risk instrument to protect against risk of loss or harm caused to the individual arising from misuse of loss of the individual's personal data by the entity.

22. A system according to claim 20 wherein said data indicating that the individual has consented to have the entity receive, or acknowledgment that the entity will receive, and use the individual's personal data comprises data uniquely identifying details relating to the individual's consent.

23. A system according to claim 22 wherein said data indicating that the individual has consented to have the entity receive, or acknowledgment that the entity will receive, and use the individual's personal data and uniquely identifying details relating to the individual's consent is compressed using a has function.

24. A system according to claim 23 wherein said data received from the entity comprising personal data collected by the entity from the individual includes the data transmitted to the entity uniquely identifying details relating to the individual's consent.

25. A system according to claim 20 wherein the individual is informed in an official language of the individual's country of location.

26. A system according to claim 20 comprising means for conducting a multi-entity privacy policy certification program requiring member entities to certify compliance with approved privacy standards for the use of personal data of individuals and means for providing such entities with a policy notice to confirm their approval by, and membership in, the program.

27. A system according to claim 26 wherein the approved standards meet the standards required by the United States, European Union, or other countries or regional organizations.

28. A system according to claim 26 further comprising means for having audits or other assessments performed upon entities seeking or having membership in the privacy policy certification program to ensure that the entities' privacy practices satisfy the standards approved and required by the program.

29. A system according to claim 28 further comprising means for having random inspections or audits performed upon member entities to verify compliance by the entities with their approved privacy practices.

30. A system according to claim 29 further comprising means for providing notice to an entity of a violation of the entity's approved privacy practices upon discovery thereof and means for providing a request for correction to the entity.

31. A system according to claim 30 further comprising means for extinguishing an entity's policy notice upon failure by the entity to comply with a request for correction.

32. A system according to claim 31 further comprising means for, upon any continued improper use of a policy notice by an entity, providing to an appropriate regulatory authority notice of such improper use, and initiating an enforcement action to terminate such use.

33. A system according to claim 20 wherein the data received from the entity comprising the individual's stored personal data includes the time period of the individual's consent or acknowledgment, the length of time that the individual's personal data will be retained, and an option to extend or renew the individual's consent or acknowledgment, if desired, notice thereof being provided to the entity and the individual in advance of expiration of the consent.

34. A system according to claim 33 further comprising means for providing the individual with the option of having the individual's personal data deleted from the entity's data storage upon expiration of the agreement.

35. A system according to claim 21 wherein as prerequisites to membership in the privacy policy certification program, an entity is required to agree to (a) work with providers of insurance or equivalent risk instruments to resolve disputes with individuals, and (b) reimburse providers of insurance or equivalent risk instruments for claims paid to individuals due to violations of their privacy rights by the entity.

36. A system according to claim 26 wherein the computer network is the Internet.

* * * * *

UNITED STATES PATENT AND TRADEMARK OFFICE
CERTIFICATE OF CORRECTION

PATENT NO. : 6,904,417 B2  
DATED : June 7, 2005  
INVENTOR(S) : Gary Clayton et al.

It is certified that error appears in the above-identified patent and that said Letters Patent is hereby corrected as shown below:

Column 1,  
Line 31, replace "hffp" with -- http --.  
Line 32, replace "orp" with -- org --.  
Line 42, replace "arty" with -- any --.

Column 5,  
Line 37, replace "in" with -- an --.

Column 13,  
Line 17, replace "x" with -- X --.

Signed and Sealed this

Eighth Day of November, 2005

JON W. DUDAS  
*Director of the United States Patent and Trademark Office*